United States Patent [19]
Frohman-Bentchkowsky

[11] 3,728,695

[45] Apr. 17, 1973

[54] RANDOM-ACCESS FLOATING GATE MOS MEMORY ARRAY

[75] Inventor: Dov Frohman-Bentchkowsky, Los Altos, Calif.

[73] Assignee: Intel Corporation, Mountain View, Calif.

[22] Filed: Oct. 6, 1971

[21] Appl. No.: 186,995

[52] U.S. Cl. ...........340/173 R, 307/238, 317/235 B, 317/235 G

[51] Int. Cl. .....G11c 11/40, H01l 11/00, H01l 15/00

[58] Field of Search...................340/173 R; 307/238, 307/279, 304; 317/235, 235 B, 235 G

[56] References Cited

UNITED STATES PATENTS 3,500,142 3/1970 Kahng ............................317/235 G

FOREIGN PATENTS OR APPLICATIONS 813,537 5/1969 Canada............................317/235 G

*Primary Examiner*—James W. Moffitt
*Attorney*—Spensley, Horn and Lubitz

[57] ABSTRACT

A random-access memory array which utilizes a metal-oxide-semiconductor MOS device as a storage element is disclosed. The device includes a floating gate which may be selectively charged and discharged in order to program the device with a "0" or a "1." The memory array which utilizes a plurality of these devices may be produced as an integrated circuit on a single substrate.

18 Claims, 9 Drawing Figures

DOV FROHMAN-BENTCHKOWSKY
INVENTOR.

BY

Spensley, Horn & Lubitz
ATTORNEYS

PATENTED APR 17 1973 3,728,695

DOV FROHMAN-BENTCHOWSKY
INVENTOR.

BY
Spensley, Horn & Lubitz
ATTORNEYS

DOV FROHMAN-BENTCHKOWSKY
INVENTOR.

BY Spensley, Horn & Lubitz
ATTORNEYS

DOV FROHMAN-BENTCHKOWSKY
INVENTOR.

BY Spensley, Horn & Lubitz
ATTORNEYS

RANDOM-ACCESS FLOATING GATE MOS MEMORY ARRAY

BACKGROUND OF THE INVENTION

1. Field of the Invention

The invention relates to the field of semiconductor memory arrays.

2. Prior Art

Semiconductor memory arrays have received considerable attention in recent years. These arrays have numerous advantages over magnetic storage devices in that they require less power to operate and additionally, a greater amount of information may be stored for a given volume. Among the prior art semiconductor arrays are included those where information is stored on a capacitor, typically parasitic capacitance, and wherein the information must be refreshed periodically. These devices have the obvious disadvantage of requiring frequent refreshing. Other prior art semiconductor arrays use flip-flop or equivalent circuits for storing information. These prior art devices require constant power in order to store information. Thus if an unexpected power interruption occurs, stored information may be lost. The presently disclosed semiconductor arrays do not require power to retain their stored information, nor do they require refreshing.

In co-pending application entitled "Electrically Alterable Floating Gate Device and Method for Altering Same," Ser. No. 106,643, filed Jan. 15, 1971, and assigned to the same assignee as the present application, floating gate field effect devices were disclosed wherein information is stored in the form of a charge on a floating gate. This charge may be electrically removed from the floating gate, thus allowing reprogramming of an array which utilizes these devices as storage elements.

The present application discloses several embodiments of random-access memory arrays which utilize these floating gate devices. Each array described herein may be fabricated on a single substrate and in some embodiments the storage element alone, without additional circuit elements, is utilized for the storage of a single bit of information, thus making it possible to realize a semiconductor memory array which utilizes a single circuit device for each bit of capacity of a memory array.

SUMMARY OF THE INVENTION

A semiconductor memory array which utilizes floating gate MOS devices as storage elements in the array is disclosed. In one embodiment each storage device comprises a substrate of a first conductivity type and two spaced-apart regions of opposite conductivity types. A floating gate is disposed between said two spaced-apart regions and completely insulated from said substrate by silicon oxide. A second and third gate are disposed above said floating gate and insulated from said floating gate by a layer of silicon-oxide. In the various embodiments described the spaced-apart regions of the device commonly referred to as the "source" and "drain" and the second and third gates are coupled to the X lines and Y lines in the array and in some cases, to a common ground line or other common lines in the array. By the application of appropriate voltages to the lines of the array charge may be selectively placed on and removed from the floating gates of the storage elements in the array, thereby programming the array with "1"s and "0"s. By the application of other voltages to the array the information programmed into the array may be read from the array.

In all the embodiments described below the memory arrays may be fabricated on a single substrate, such as a silicon substrate, utilizing known MOS techniques.

DETAILED DESCRIPTION OF THE INVENTION

Figure 1:
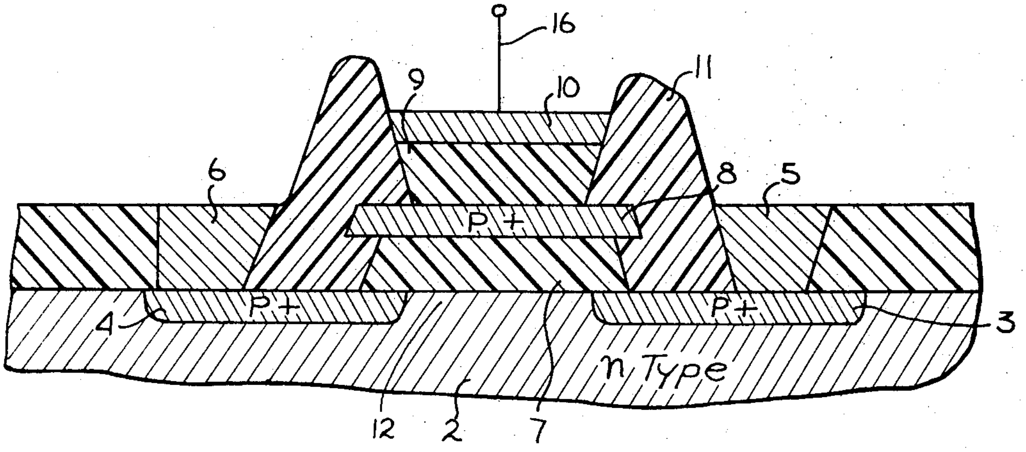
FIG. 1 is a cross-sectional view of a storage device which includes a pair of spaced-apart $P^+$ regions on an N-type silicon substrate (P channel device), a floating gate and a second gate.
Figure 2:
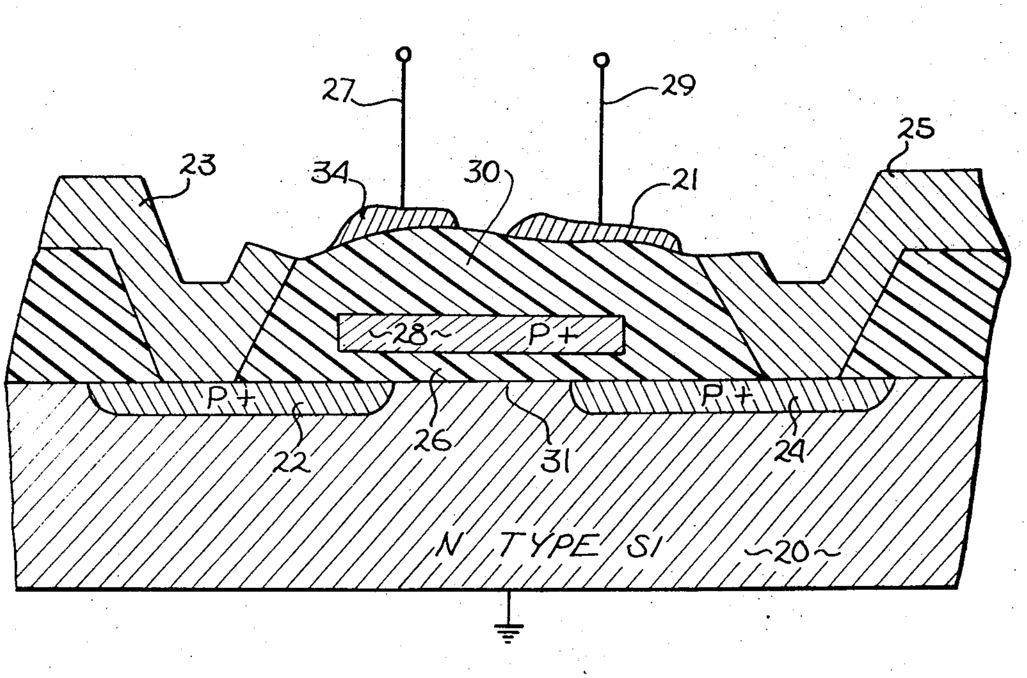
FIG. 2 is a cross-sectional view of an alternate embodiment of the storage device of FIG. 1 which includes a pair of spaced-apart $P^+$ regions on an N-type silicon substrate (P channel device), a floating gate and a second and third gate.

In FIGS. 1 and 2 MOS floating gate devices which are utilized in the memory array disclosed herein as storage elements are illustrated. The method of constructing these devices and techniques for charging and discharging them are discussed in co-pending application entitled "Electrically Alterable Floating Gate Devices and Method for Altering Same," Ser. No. 106,643, filed Jan. 15, 1971, and assigned to the same assignee of the present application.

In FIG. 1 the storage element shown therein comprises a P-channel field effect device illustrated on an N-type substrate 2. A pair of spaced-apart $P^+$ regions 3 and 4 referred to as "source" and "drain" are disposed on a silicon substrate 2 and define the channel 12. A first insulative layer 7, which in the presently preferred embodiment comprises silicon oxide ($SiO, SiO_2$) is disposed above the channel 12 and insulates the channel 12 from the floating gate 8. The floating gate 8 which is disposed between the spaced-apart regions 3 and 4 in the presently preferred embodiment comprises a $P^+$ polycrystalline silicon. A second insulating layer 9 is disposed above the floating gate 8 and separates that gate from the second gate 10 which is a metal gate. The insulative layer 9 in the presently preferred embodiment also comprises a silicon oxide. Gate 10 may be an ordinary metal gate such as an aluminum gate. Lead 16 is coupled to gate 10 such that voltages may be applied to that gate. Additional insulation 11 as illustrated in FIG. 1, which again in the presently preferred embodiment comprises silicon oxide, is utilized to insulate the floating gate 8 from the metal contacts 5 and 6 which are used to form electrical contacts with the regions 3 and 4 respectively. Floating gate 8 is completely surrounded by insulative layers such that no conductive path exists to that floating gate. As explained in the above referenced application, this device may be fabricated utilizing known MOS technology.

The P-channel device illustrated in FIG. 2 is similar to the device in FIG. 1 except that two gates, a second gate 34 and a third gate 21, are disposed above the floating gate 28. The device of FIG. 2 is again disposed on an N-type silicon substrate 20 in which two spaced-apart $P^+$ regions 22 and 24 are shown. A first insulative layer 26 which again in the presently preferred embodiment comprises silicon oxide, is disposed between channel 31 defined by the regions 22 and 24 and the $P^+$ polycrystalline silicon floating gate 28. The pair of metal gates 34 and 21 disposed above the floating gate 28 comprise metal gates such as aluminum gates. An insulative layer 30 insulates these gates from the floating gate 28. The floating gate 28 is completely surrounded by insulation as is gate 8 of FIG. 1, such that no conductive paths exist to said floating gate. In the presently preferred embodiment gate 21, which is coupled to lead 29, is larger in area than gate 34 which is coupled to lead 27. Metal contacts 23 and 25 are coupled to regions 22 and 24, respectively, such that electrical contact may be made with these regions. This device may be also constructed utilizing known MOS technology, as discussed in the above referenced application.

In some of the embodiments described herein a device similar to the device illustrated in FIG. 2 is utilized as a storage element wherein an N-channel device is used instead of the P-channel device illustrated in FIG. 2. In these applications the device is disposed on a P-type silicon substrate and includes a pair of spaced-apart $N^+$ regions. The remainder of this N-channel device is the same as the P-channel device of FIG. 2, including the $P^+$ silicon gate.

The devices of FIGS. 1 and 2 are utilized to store information by selectively placing a charge on the desired floating gates of the storage elements in the array. When a charge is placed on the floating gates of the devices of FIGS. 1 and 2 the characteristic of the devices changes, thereby allowing the devices to be used as memory or storage elements. The methods of charging and discharging the devices illustrated in FIGS. 1 and 2 that is, the method of placing and removing a charge from the floating gates 8 and 28 are also described in the above referenced application. In each of the embodiments of the memory array described below the method of charging and discharging the floating gates will be described in conjunction with the write and/or read cycle of the array. For the purposes of this application it will be assumed that the "O" state of the device is that state where the storage element has a conductive path between its source and drain when in a memory array. The "1" state is that state where the device will not have a conductive path between its source and drain in the memory array. As will be seen from the various embodiments described below the "0" and "1" states are achieved depending on the type of device (P-channel or N-channel) and the configuration of the array, by charging the floating gate negatively, by having no charge on the floating gate, or by having a positive charge on the floating gate. Additionallly, the conductive characteristic of the devices in the various arrays is affected by the application of voltages to its other gate or gates.

Figure 3:
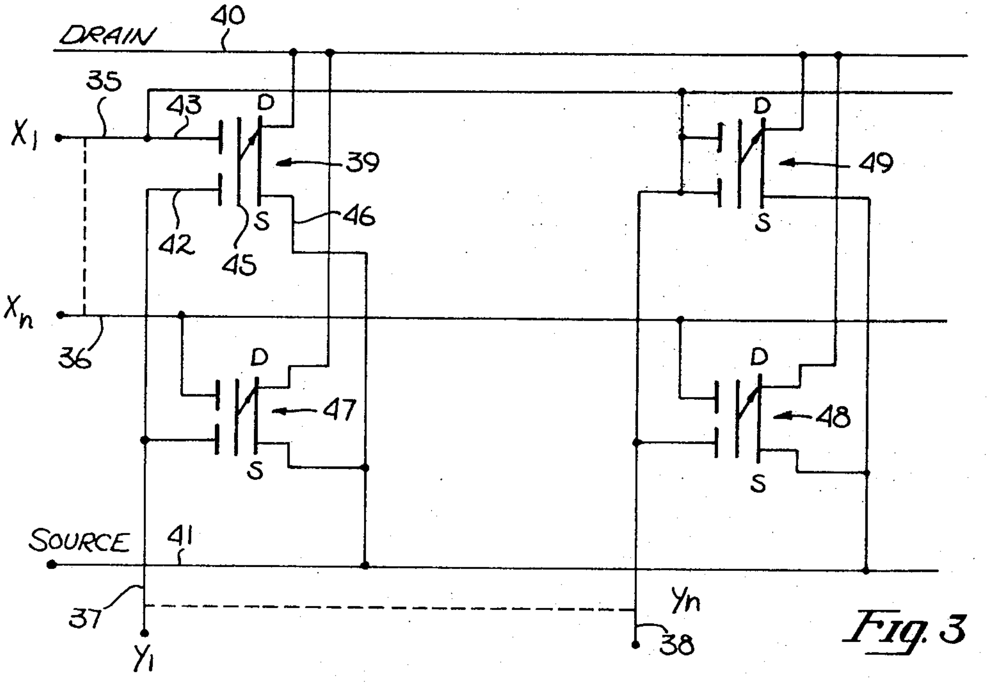
FIG. 3 is a circuit diagram of a memory array built in accordance with the present invention which utilizes as storage elements N-channel floating gate devices having a second and third gate, similar to the device illustrated in FIG. 2.
Figure 4:
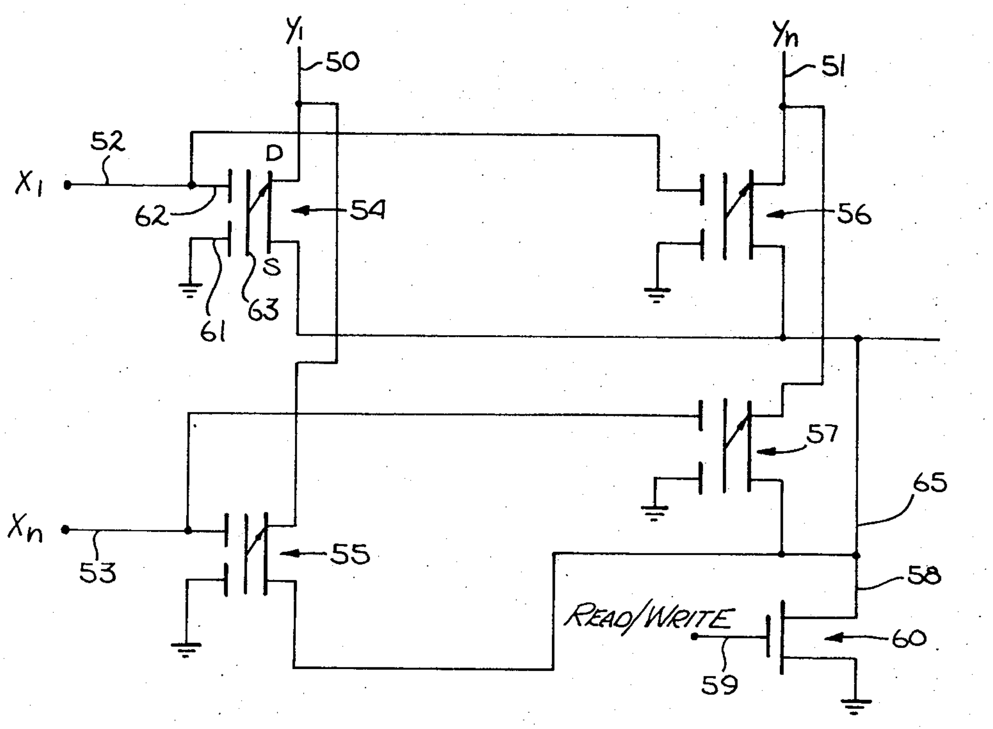
FIG. 4 is an alternate embodiment of the memory array illustrated in FIG. 3 which utilizes as storage elements the device illustrated in FIG. 2.
Figure 5:
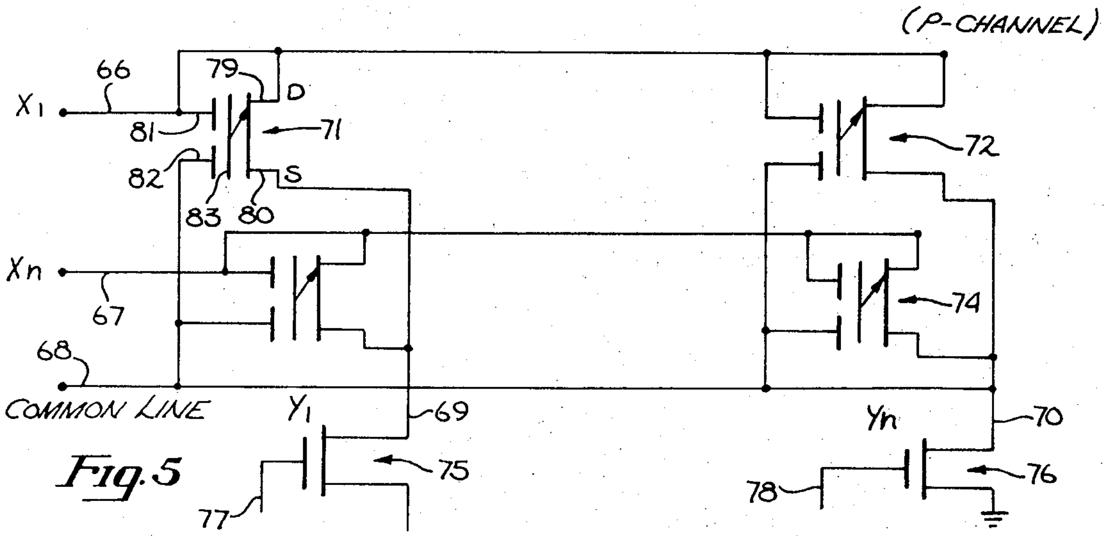
FIG. 5 is a circuit diagram of an alternate embodiment of the memory array illustrated in FIG. 4, which utilizes as storage elements the device illustrated in FIG. 2.

For the embodiments of the invention which utilize one device per bit such as in FIGS. 3, 4 and 5, the devices operate between two normally-off states, but conduct in one normally-off state when a voltage is applied to the gates. For the P-channel devices (FIG. 2), the two normally-off states are the state when no charge (or very little negative charge) is present on the floating gate and when a positive charge is present on the floating gate. For the N-channel device the two normally-off states are the state when the floating gate is negatively charged and when no charge exists on the floating gate.

Referring to FIG. 3, a first embodiment of the present invention is illustrated which comprises a random access memory array having X lines, $X_1$ and $X_n$, (lines 35 and 36 respectively), and Y lines, $Y_1$ and $Y_n$ (lines 37 and 38, respectively). Only two X lines and two Y lines are illustrated, but it is obvious that the array may comprise any number of X lines and Y lines and hence comprise an array with any desired memory capacity. In FIG. 3 four storage devices 39, 47, 48 and 49 are illustrated. A common drain line 40 and a common source line 41 are also utilized in the array of FIG. 3. Devices 39, 47, 48 and 49 may be identical MOS floating gate devices. These devices may be similar to the device illustrated in FIG. 2 except that these devices are N-channel devices and not the P-channel devices illustrated in that figure. In the preferred embodiment these devices utilize a polycrystalline $P^+$ silicon floating gate.

Referring to device 39, its source terminal 46 is coupled to the common source line 41. Device 39 has its drain terminal coupled to the common drain line 40. Gate 42 of device 39 which corresponds to gate 21 of the device illustrated in FIG. 2 is coupled to the $Y_1$ line, line 37. Gate 43, which corresponds to gate 34 of FIG. 2, is coupled to the $X_1$ line, line 35. Devices 47, 48 and 49 are coupled to their respective X and Y lines in the same manner as is device 39. These devices have their source terminal coupled to the common source line 41 and their drain terminal coupled to the common drain line 40, as illustrated. The memory array shown in FIG. 3 may be fabricated as an integrated circuit utilizing known MOS technology or a single substrate.

For the N-channel devices used in the array of FIG. 3, such as device 39, no conductive path exists between the source and drain of these devices when the floating gate is charged or uncharged. These devices operate between a first off state when no charge exists on the floating gates and a second off state (which is a further off state than the first off state) when a negative charge exists on the floating gate. These devices will conduct between their source and drain when their floating gates are not charged when a voltage is applied to at least one of the other gates such as gate 21 or 34 of FIG. 2; thus, the "O" state for the devices in the array is the state where the floating gates are not charged and the "1" state is the state where the floating gates are negatively charged.

To write a "1" into device 39 the source and drain lines 40 and 41 are held at the positive voltage V, along with the selected Y line, $Y_1$, while the selected X line, $X_1$, is grounded. The unselected X lines are held at the voltage $V_1$ while the unselected Y lines are grounded. When this occurs a negative charge will be transferred to floating gate 45 by the mechanisms explained in the above-referenced application. In a similar manner any selected storage device in the array, such as devices 47, 48 and 49, may be selectively programmed with a "1."

In order to program the array (write cycle), assume first that it is necessary to write a "0" onto device 39. In order to do this the source line 41, the drain line 40 and the $Y_1$ line are grounded, while a voltage (+V) is applied to the $X_1$ line. The unselected X lines in the array such as $X_n$ are grounded and the unselected Y lines in the array are held at a voltage of $+V_1$. Voltage V is of a larger positive magnitude than voltage $V_1$. When this voltage condition occurs any negative charge on the device will be removed and the device will be substantially uncharged and hence will not conduct between its source and drain. By a similar manner a "0" may be written into any selected device in the array.

It should be noted that during the "write cycle" described above, the unselected devices in the array will not be programmed because the voltages applied to the unselected X and Y lines prevent any charge from being transferred onto or removed from the floating gates of these devices. Additionally, it is possible to reprogram the array any number of times simply by writing the desired information into the array.

To read information from the array, assume that it is necessary to determine the state of device 39. A positive voltage $V_1$ is applied to the selected X and Y lines, $X_1$ and $Y_1$, while the unselected X and Y lines are grounded. The source line 41 is grounded and the drain line 40 is positively charged. If a "0" exists on floating gate 45, that is, if the floating gate is not negatively charged, a conductive path will exist between the drain and source of device 39, causing the charge on line 40 to discharge through device 39 and line 41. Note that all the remaining devices in the array have at least one of their gates grounded. Under these conditions even those devices which have negative charges on their floating gates will not conduct and hence no interference paths exist in the array which will prevent the reading of information from any single device in the array. If device 39 is in the "1" state, that is, negative charge is present on its floating gate 45, no conductive path will exist between lines 40 and 42 and hence this state may be readily detected by sensing the fact that the drain line 40 does not discharge. In a similar manner the state of any device in the array may be determined. Note that the voltage $V_1$ used during the read cycle must be of a smaller magnitude than V in order to prevent writing or erasing information stored in the array.

The random access memory array of FIG. 3 has the advantage that its X and Y lines are coupled to high impedence terminals (the second and third gates of the storage elements). Therefore, practically no current drive is required on these lines; this simplifies the design of the decoding circuitry that may be used with this array.

Referring to FIG. 4, an alternate embodiment of the random access memory array of FIG. 3 is illustrated wherein P-channel devices such as the device illustrated in FIG. 2 are utilized as memory elements. Four such elements are illustrated in the array of FIG. 4 as devices 54, 55, 56, and 57. The array of FIG. 4 includes two X lines, $X_1$, line 52, and $X_n$, line 53. Two Y lines are illustrated in the array, $Y_1$, line 50, and line $Y_n$, line 51. The array also includes a common line 65 which is coupled to transistor 60. It will be obvious that any number of X lines, Y lines and storage elements may be utilized in the array of FIG. 4, but for the purpose of explanation only two such X lines, Y lines and storage elements have been illustrated. The device 54 has one of its terminals, its drain, coupled to line 50, the $Y_1$ line. The other of its terminals, its source, is coupled to one terminal 58 of the field effect transistor 60 through the common line 65. The field effect transistor 60 has its other terminal coupled to ground and its gate coupled to the read/write line 59. One of the gates 62 of device 54, said gate corresponding to gate 34 of FIG. 2, is coupled to line $X_1$; the other of its gates 61, which corresponds to gate 21 of the device illustrated in FIG. 2, is coupled to ground.

The remaining devices in the array, such as devices 55, 56 and 57, are coupled to their respective X and Y lines in identical fashion as device 54, and have their source terminals coupled to terminal 58 through the common line 65. Note that one of the gates of device 56 is coupled to the X line, $X_1$, line 52; if other storage elements are included along the $X_1$ line one of the gates of each such device would also be coupled to line 52. Likewise, line $X_n$ is coupled to one of the gates of devices 55 and 57. The array may include a common ground line to couple one gate of each storage element in the array to ground.

The field effect transistor 60 is assumed to be a P-channel device; thus this transistor, along with the other devices in the array, may be fabricated on a single N-type substrate as an integrated circuit, utilizing known MOS technology.

Device 54 (as well as devices 55, 56 and 57) conducts between its source and drain terminal when its floating gate 63 is negatively charged. To utilize the array of FIG. 4 as a random access memory the floating gates, which are to be programmed with a "1," that is, the non-conductive state, must contain a positive charge in order for its respective device to be non-conductive in the read cycle. This is accomplished by the techniques discussed in the above referenced application for discharging a floating gate such as floating gate 63 of device 54. By discharging the floating gate with a sufficient discharge, electrons are drawn from the gate in sufficient quantity to leave the gate positively charged. Once the floating gate is positively charged, no conductive path will exist between the source and drain terminals, thereby enabling a device to be programmed with a "1."

In order to program the array of FIG. 4 a selected device, or all the devices located along any selected X or Y line of the array, or the entire array is first programmed with a "1." Examining device 54, this device may be programmed with a "1" by placing a negative voltage V on the selected X line, $X_1$, and a negative voltage V on the selected Y line, $Y_1$. The unselected X lines, such as $X_n$, are coupled to a voltage of approximately $-V/2$ while the unselected Y lines are grounded. The read/write line 59 may be grounded; thus, transistor 60 will not conduct and common line 65, which is coupled to the sources of all the devices in the array will be floating. Under there voltage conditions, a negative charge will be removed from floating gate 63 of sufficient quantity to leave its floating gate 63 positively charged provided that V is of a sufficient magnitude. By similar method the other devices in the array may be programmed with a "1." If it is intended to program device 54 with a "1" the program is obviously completed for this device. If, on the other hand, it is desired to program this device with a "0" the selected X line, line 52, is grounded and the selected Y line, line 50, is held at a negative voltage V. The unselected Y lines are grounded while the unselected X lines are held at a negative voltage of approximately $V/2$ Once again, the gate 59 of transistor 60 is grounded, thereby leaving terminal 59 and the sources of all the devices in the array floating. Under these voltage conditions, an avalanche injection will occur from the substrate of device 54, negatively charging floating gate 63. In a similar manner, by properly applying the control voltages to the various lines in the array, the entire array may be selectively programmed with "1"s and "0"s as desired.

Note that when a "1" is written onto device 54 the other devices along line $X_1$ will not be programmed since their sources are coupled to ground, and likewise, the other devices along line $Y_1$ will not be programmed with a "1" since one of their gates is at the voltage $V/2$, this voltage being sufficient to prevent a discharge of electrons from the floating gates of the devices located along line $Y_1$. Similarly, when a "0" is written into device 54 an avalanche injection will not occur in the other devices along line $X_1$, such as device 56, since the drain terminals of these devices are grounded. Additionally, the floating gates of the devices located along line $Y_1$, except device 54, will not be negatively charged when an "0" is written into device 54, since the unselected X lines such as line 53 are held at a negative potential of $V/2$ which is sufficient to prevent avalanche injection in any of these devices except the selected device 54.

Assume it is necessary to determine the state of device 54, that is, to determine whether that device has been programmed with a "1" or a "0" (read-cycle). To do this, the selected X line, $X_1$, is held at a negative voltage of $V_1$ while the selected Y line, line 50, is precharged negatively. The unselected X and Y lines such as lines 53 and 51 are held at ground potential. A negative voltage $V_1$ is applied to line 59. With a negative voltage applied to line 59 the P-channel device 60 will conduct and a conductive path will exist from line 50 through device 54, common line 65 and transistor 60 to ground, if device 54 has been programmed with a "0." If device 54 has been programmed with a "1" no conductive path will exist through that device. Thus, by sensing the discharge of the voltage applied on line 50, the state of device 54 may be readily determined. In a similar manner the state of any of the other devices in the array may be readily determined. Note that even if device 55 is programmed with a "0" it will not conduct and interfere with the reading of device 54 since both of its gates are grounded. Device 56 will also not interfere with the reading of device 54. If device 56 is programmed with a "1" it will not conduct and hence does not provide any possible interference paths. On the other hand, if device 56 is programmed with a "0" it would provide an additional path to ground, such as the path provided by the common line 65 through transistor 60 for the source of device 54 and likewise will not cause any interference. For the same reasons device 57 will not cause any interference with the reading of device 54. During the read-cycle the negative voltage $V_1$, which is utilized, is of a considerably smaller magnitude than the voltage V, which is utilized during the write-cycle. The voltage $V_1$ must not be of sufficient magnitude to cause avalanching in any of the devices in the array since this may improperly reprogram the array.

Referring to FIG. 5, an alternate embodiment of the array of FIG. 4 is illustrated wherein one of the metal gates of each of the devices of the array is coupled to a common line 68. The array comprises X lines, $X_1$, line 66, and $X_n$, line 57, and Y lines $Y_1$, line 69, and $Y_n$, line 70. The devices 71, 72, 73 and 74 are again the P-channel devices illustrated in FIG. 2. Device 71 has its drain terminal 79 and one of its metal gates 81, which corresponds to gate 21 of FIG. 2 coupled to the $X_1$ line, line 66. Likewise, the drain of device 72 and one of its metal gates are coupled to the line $X_1$, line 66. The gate 82 of device 71 is coupled to line 68; in a similar fashion, one of the gates of the remaining devices in the array, is also coupled to common line 68. These gates correspond to gate 34 of the device illustrated in FIG. 2. The source terminal 80 of device 71 is coupled to the $Y_1$ line, line 69, as is the source terminal of device 73. The source terminals of devices 72 and 74 are coupled to their respective Y line, line $Y_n$. Line $Y_1$ is coupled to one terminal of the P-channel field effect transistor 75. The other terminal of transistor 75 is coupled to ground and its gate terminal is coupled to line 77. Line 70 is coupled to one terminal of the P-channel field effect transistor 75, while the other terminal of this field effect transistor is coupled to ground. The gate of transistor 76 is coupled to line 78. Once again, the array of FIG. 5 may contain any number of X lines and Y lines and any number of devices such as devices 71 through 74, and these devices would be coupled into the array in the same manner as the devices illustrated in FIG. 5. This array may be produced on an N-type substrate as an integrated circuit, using known MOS techniques.

The memory storage elements, devices 71 through 74, of the random-access memory of FIG. 5, as in the case of the other arrays described, are programmable with either a "0" or a "1." The "1" state for the device in this array is that state when the device does not conduct between its source and drain and is the state when the floating gates such as floating gate 83 of device 71, are positively charged. The "0" state is that state where the floating gates of the devices are negatively charged, but not normally on.

The array of FIG. 5 is programmed by first writing a "1" on each of the devices and then selectively writing "0"s into desired locations. The writing of "1"s into the devices in the array as in the case of the array of FIG. 4 also serves to erase the array. For the array of FIG. 5 each of the devices along an X line is programmed with "1"s simultaneously. The method by which this is accomplished is the method described in the above mentioned application for discharging the floating gates of the devices; that is, a negative charge is removed from the floating gates in sufficient quantity to cause the gates to be positively charged. For example, assume that it is necessary to program the devices along line $X_1$ with "1"s. A negative voltage V is applied to line 66 while lines 67, 68, 77 and 78 are grounded. Note that when lines 77 and 78 are grounded, lines $Y_1$ and $Y_n$ are floating and hence the sources of all the devices in the array will be floating. When these conditions are met a negative charge is removed from the floating gates of all the devices located along the selected X line, $X_1$, positively charging the floating gates of the devices. Note that the magnitude of the negative voltage applied must be sufficient to assure that sufficient electrons have been removed from the floating gates so that they are positively charged. Note also that the devices located along the other X lines such as line 67 will not have their floating gates positively charged since their second and third gates are coupled to ground. Assume it is necessary to write a "0" into device 71. This is accomplished by applying a negative voltage of magnitude V to line 66 and a negative voltage of magnitude $V_1$ to line 77. When a negative voltage is applied to the gate of the P-channel field effect transistor 77 this transistor will be "on" and hence the selected Y line, $Y_1$, will be grounded. The unselected X lines such as $X_n$ are grounded, while the unselected Y lines such as line 70 remain floating. This may be accomplished by grounding line 78. A negative voltage which may be of magnitude $V_1$ is applied to line 68. When these conditions are met an avalanche injection will occur at the drain of device 71, thereby negatively charging floating gate 83. Note that device 73 will not be affected since its drain terminal is coupled to ground. Likewise device 72 will not be affected since its source terminal is floating.

In a similar fashion, any of the other devices located along line $X_1$ may be programmed with a "0." Also any of the other X lines in the array may be programmed in the same manner as line 66 was programmed by first writing "1"s into all the devices located along the selected X line and then selectively writing "0"s at the desired locations. Note that the voltage $V_1$ may be of a smaller magnitude than the voltage V, since the voltage $V_1$ is not used to cause an avalanche injection in the devices but rather to control the devices to which it is applied.

Assume that it is necessary to determine the state of device 71, that is to determine whether a "0" or a "1" is stored on this device. Line $X_1$ is precharged negatively while a negative voltage is applied to line 77 of sufficient magnitude to turn on transistor 75 so that the selected Y line $Y_1$ is grounded. The unselected X lines, line 68 and line 78, are all grounded during the read-cycle when it is necessary to determine the state of device 71. If a "0" is stored on device 71, that is, a negative charge exists on its floating gate 83, a conductive path will exist from line 66 through device 71 and transistor 75 to ground. If a "1" is stored on device 71, that is, a positive charge exists on its floating gate 83, no conductive path will exist between the source and drain of device 71 and the negative charge placed on line 66 will remain thereon. Thus, by sensing the presence or absence of charge on line $X_1$ the state of device 71 may be readily determined. Note that no conductive path will exist through device 72 when information is read from device 71, even if device 72 is programmed with a "0," since the source of that device and all other devices which may be located along line $X_1$ are floating. An examination of the array will show that no other interference paths exist that will interfere with the reading of the selected device 71. In a similar manner the state of the other devices in the array, such as devices 72, 73 and 74, may be determined. Note that as in the case of the other arrays the voltages which are utilized to read information from the array must be of smaller negative value than the voltage V utilized to program the array since the voltages utilized to read information from the array must not cause avalanche injection in any of the devices in the array.

As in the case of the array of FIG. 4 the array of FIG. 5 may be an integrated circuit fabricated on an N-type silicon substrate utilizing known MOS technology.

Figure 6:
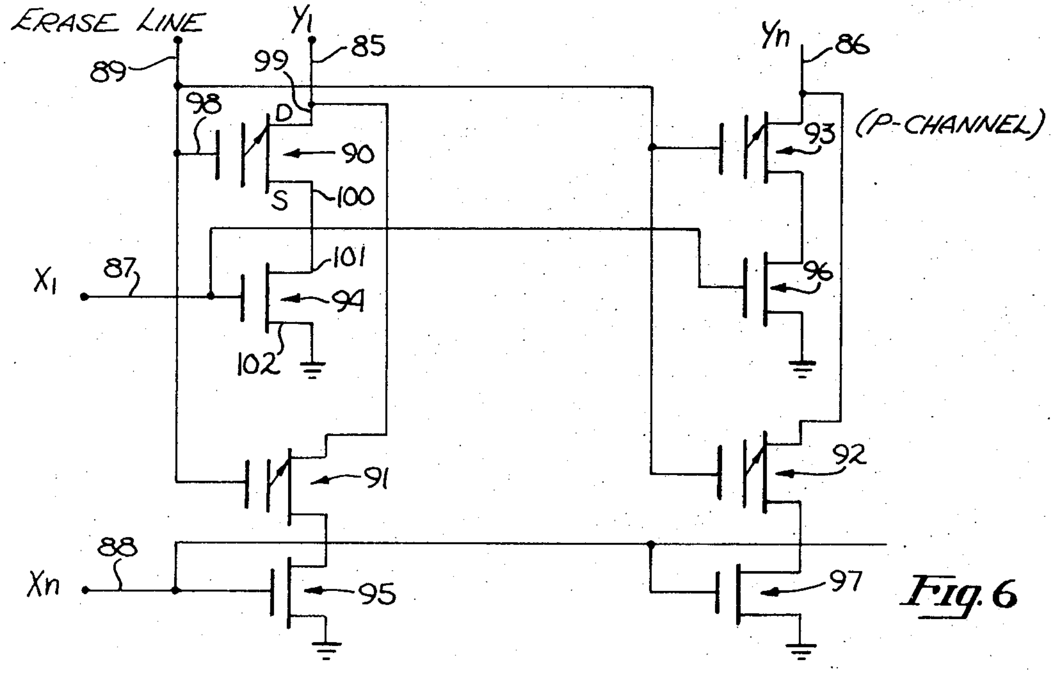
FIG. 6 is a circuit diagram of a memory array built in accordance with the present invention which includes a plurality of memory cells, each of which comprises a storage element, such as the device illustrated in FIG. 1, and a field effect transistor.

Referring to FIG. 6, a memory array is shown having Y lines, $Y_1$, line 85, and $Y_n$, line 86, and X lines $X_1$, line 87, and $X_n$, line 88. Four memory cells are illustrated coupled to the X lines and Y lines of the array. Each memory cell comprises a memory storage device having a floating gate and one additional gate such as the P-channel device illustrated in FIG. 1, and a field effect transistor. A memory cell comprising device 90 and transistor 94 is coupled to the $X_1$ and $Y_1$ lines of the array. Also a memory cell comprising device 91 and transistor 95 is coupled to the $X_1$ and $Y_n$ lines of the array. Similarly a memory cell comprising device 93 and transistor 96 is coupled to the $X_1$ and $Y_n$ lines of the array and a memory cell comprising device 92 and transistor 97 is coupled to the $X_n$ and $Y_n$ lines of the array. Each of the memory cells of the array of FIG. 6 may be identical and the entire array may be fabricated on an N-type silicon substrate utilizing known MOS technology. It will be obvious that the array may contain any number of X and Y lines and hence contain any number of memory cells.

The memory cell coupled to lines $X_1$ and $Y_1$ comprises the P-channel floating gate device 90 which has its drain terminal 99 coupled to the $X_1$ line and its gate 98 coupled to a common erase line 89. The gate 98 corresponds to the metal gate 10 illustrated in FIG. 1. The source terminal 100 of device 90 is coupled to one terminal, terminal 101, of the P-channel field effect transistor 94. The other terminal 102 of device 94 is coupled to ground. The gate of transistor 94 is coupled to the $X_1$ line, line 89. The other memory cells in the array are coupled to their respective X lines and Y lines in an identical fashion. The field effect transistor associated with each of the storage elements such as transistors 94, 95, 96 and 97 serve the purpose of isolating the storage device from the remainder of the array. Note that all the gates of the devices 90, 91, 92 and 93 are coupled to the common erase line 89. A common ground line may be used to couple all of the grounded terminals of the field effect transistor, such as terminal 102, to ground.

An array similar to the array shown in FIG. 6 is described in co-pending application Ser. No. 146,358, filed May 24, 1971. This application is assigned to the same assignee as the present application. In this co-pending application a read only memory was described which was not electrically erasable as is the memory array illustrated in FIG. 6. The array of FIG. 6 may be programmed and information may be read from the array in the same manner as described in the previous application.

The storage elements in the array, devices 90, 91, 92 and 93, have their floating gates negatively charged when a "0" is programmed into the device and when no charge exists on their floating gates they are in the "1" state. The storage elements conduct between their drain and source when their floating gates are negatively charged, and when their floating gates are not charged, no conductive path will exist between their drain and source.

By applying a positive voltage to line 89, while the other lines in the array are grounded, any negative charge stored on any of the floating gates of the memory elements in the array will be removed from the floating gate. A voltage of approximately plus 50 volts has been found to be sufficient for erasing the array for the presently preferred embodiment of the storage element shown in FIG. 1. Thus, by applying a positive voltage the entire array is programmed with "1"s. Assume that it is necessary to write a "0" into device 90, a negative voltage is applied to line $X_1$, this voltage being of sufficient magnitude to turn on transistor 94 while a second negative voltage (of approximately 35 volts for the presently preferred embodiment of the device of FIG. 1) is applied to line 85. The unselected X lines and Y lines in the array as well as the erase line 89 are grounded. The negative voltage applied to line $Y_1$ will cause an avalanche injection and negatively charge the floating gate of device 90, thereby placing that device in the "0" state. Note that when this occurs device 91 will not be programmed with a "0" since the gate of transistor 95 is grounded, thereby preventing a current path between the drain and source of transistor 91. Similarly device 92 will not be programmed when device 90 is programmed even though transistor 96 is turned on since the drain terminal of device 93 is coupled to ground. In a similar manner any of the other storage elements in the array may be programmed with a "0."

Assume that it is necessary to determine the state of device 90, that is, to read information from device 90. A negative voltage is applied to line $X_1$ and line $Y_1$ is precharged negatively. The other X and Y lines and the erase line 89 are grounded for the reading of device 90. If device 90 contains a "1" no current path will exist between its drain and source and the negative charge placed on line 85 will remain thereon. If, on the other hand, device 90 has been programmed with a "0" a conductive path will exist between its drain and source and through transistor 94 (which is turned on by the negative voltage applied to line 87) to ground. Thus, if a "0" is stored on device 90, line 85 will be pulled towards ground potential. Note that during the read cycle no conductive path will exist between the $Y_1$ line and ground through any of the other memory cells located along that line such as the memory cell comprising device 91 and transistor 95. Since the gate of the field effect transistor associated with each of these cells is grounded, no conductive path to ground through any of these memory cells will exist. The voltage utilized during the read cycle should be of a smaller magnitude than the voltage utilized during the write cycle to prevent avalanching in any of the devices in the array during the read cycle. For example, a voltage of approximately 15 volts has been found to be satisfactory for reading information from an array similar to the array of FIG. 6.

The array of FIG. 6 may be fabricated on an N-type silicon substrate as an integrated circuit utilizing known MOS technology. Note that the positive voltage used to erase the array or to program the array with "1"s need not be decoded on the substrate, thereby avoiding the difficulties associated with decoding a positive signal on an N-type substrate.

Figure 7:
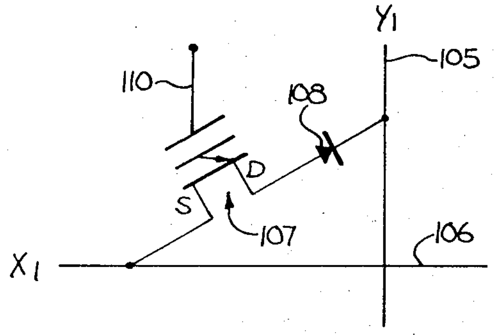
FIG. 7 is a circuit diagram of an alternate embodiment of the array illustrated in FIG. 6 wherein each memory cell includes a storage element such as the device illustrated in FIG. 1, and a diode.

Referring to FIG. 7, a portion of a memory array is is illustrated comprising X line, $X_1$, line 106, and Y line, $Y_1$, line 105. A single memory cell comprising device 107 and diode 108 is illustrated coupled between lines 105 and 106. Device 107 may be identical to the storage elements in the array of FIG. 6 such as devices 90 through 93 and the device illustrated in FIG. 1. The source terminal of device 107 is coupled to line $X_1$; the drain terminal of device 107 is coupled to one terminal of diode 108. The other terminal of diode 108 is coupled to the line $Y_1$. It will be obvious that an array of any size containing any number of X lines and Y lines and any number of memory cells may be fabricated utilizing the memory cell and connections illustrated in FIG. 7. All the gates of the storage elements such as gate 110, would be coupled to a common erase line such as line 89 of FIG. 6. The memory array of FIG. 7 may be fabricated on an N-type silicon substrate. This array performs substantially the same function as the array of FIG. 6. As was the case with the array of FIG. 6, the entire array may be programmed with "1"s by placing a positive charge on the common erase line which is coupled to gate 110. This will remove any negative charge on any of the floating gates of the storage elements such as device 107.

Assume it is necessary to program device 107 with a "0" a negative voltage is applied to line 105 while line $X_1$ is grounded. The unselected X lines in the array should be maintained at a negative voltage to prevent the passage of current through the other memory cells located along line $Y_1$. The unselected Y lines may be grounded. The magnitude of the negative voltage applied to line 105 should be sufficient to cause an avalanche injection in device 107, thereby negatively charging the floating gate of that device. In a similar fashion the other memory cells of the array may be programmed.

In order to read information from the memory cell illustrated in FIG. 7, a negative charge is placed on line $Y_1$, while line $X_1$ is grounded. The other X lines in the array should be maintained at a negative voltage in order to avoid a passage of current through the other memory cells located along line $Y_1$. If a "0" is stored within device 107, line $Y_1$ will approach ground potential since a conductive path will exist through device 107 and diode 108. Note, as in the other embodiments discussed above, it is necessary that while reading information from the array, the negative voltage utilized to sense the state of the storage elements must be of small enough magnitude to avoid avalanching within any of the storage elements in the array.

Figure 8:
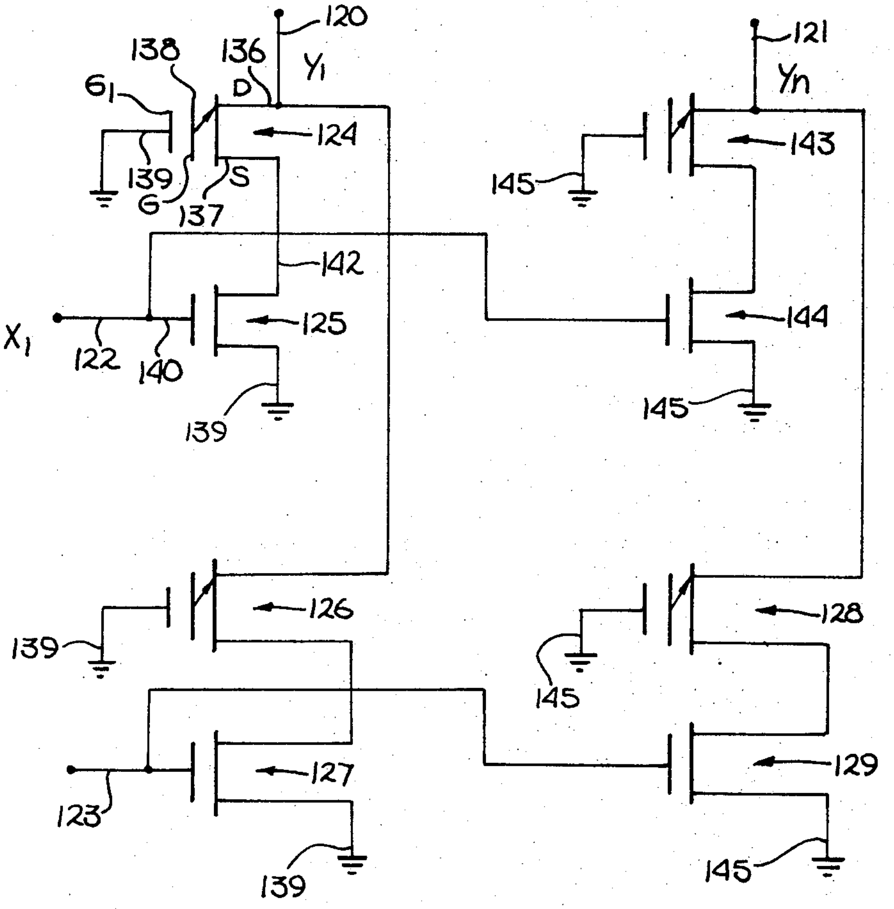
FIG. 8 is a circuit diagram of an alternate embodiment of the memory array illustrated in FIG. 6 which utilizes as storage elements the device illustrated in FIG. 1 and wherein a common ground line in the array is utilized also as the second gate of the device illustrated in FIG. 1.

Referring to FIG. 8, an alternate embodiment of the memory array of FIG. 6 is illustrated. This embodiment has the advantage of not requiring a separate erase line such as erase line 89 of FIG. 6. The common ground line in the array which is utilized to ground one terminal of the field effect transistors such as terminal 102 of the field effect transistor 94, of FIG. 6, is utilized also as a metal gate such as gate 10 of FIG. 1 and gate 98 illustrated in FIG. 6. By utilizing the common ground line in this dual capacity it is possible to realize an electrically erasable memory such as the one disclosed in application Ser. No. 146,358, filed on May 24, 1971, without increasing the size of the chip upon which the memory array is fabricated.

In FIG. 8 the memory array comprises a pair of X lines, $X_1$, line 122, and $X_n$, line 123, and a pair of Y lines, $Y_1$, line 120 and $Y_n$, line 121. As in the cases of the other arrays, the array illustrated in FIG. 8 may contain any number of X lines and Y lines and any number of memory cells. Each memory cell illustrated in FIG. 8 comprises a floating gate device such as the device illustrated in FIG. 1 and a field effect transistor. The memory cell coupled to lines $X_1$ and $Y_1$ comprise device 124 and transistor 125. The memory cell coupled to lines $X_n$ and $Y_1$ comprises the device 126 and transistor 127, the memory cell coupled to lines $X_1$ and $Y_n$ comprises the device 143 and transistor 144 and finally the memory device coupled to lines $X_n$ and $Y_n$ comprises device 128 and transistor 129.

Device 124 has its drain terminal 136 coupled to the $Y_1$ line, line 120, and its source terminal 137 coupled to terminal 142 of the P-channel field effect transistor 125. The gate 140 of transistor 125 is coupled to the $X_1$ line, line 122. The other memory cells in the array are coupled to their respective X and Y lines in the same manner as the memory cell comprising device 124 and transistor 125 is coupled to lines $X_1$ and $Y_1$.

The gate G' of device 124, the grounded terminal of transistor 125, the gate of device 126 and the grounded terminal of transistor 127 have all been designated as line 139. In the embodiment of FIG. 8 a single conductive line is used both for the purposes of grounding one terminal of the field effect transistors, such as transistors 125 and 127, and also as the metal gate disposed above the floating gate of the storage elements such as the gate G' disposed above floating gate 138. Line 139 may be a separate line for each Y line in the array or may be a common line, common to all the devices in the array. In Y line, $Y_n$, this common line has been designated as line 145. If a single line is to be used in the array lines 135 and 145 would be a common ground line. As will be seen from the explanation herein it will be possible to erase a negative charge stored on the floating gates of the storage elements located along any desired Y line of the array such as floating gate 138 of device 124 and the floating gate of device 126, when the gates of these devices are grounded. The lines 139 and 145 may be readily disposed above the channels of each of the storage elements such as channel 12 of FIG. 1 so that they may form the metal gates for these devices and also be coupled to one terminal of the field effect transistors. It is obvious that with this embodiment an array requiring less area than the array of FIG. 6 may be fabricated since a single line is utilized both for grounded one terminal of the field effect transistors and as the metal gates for the storage elements.

Figure 9:
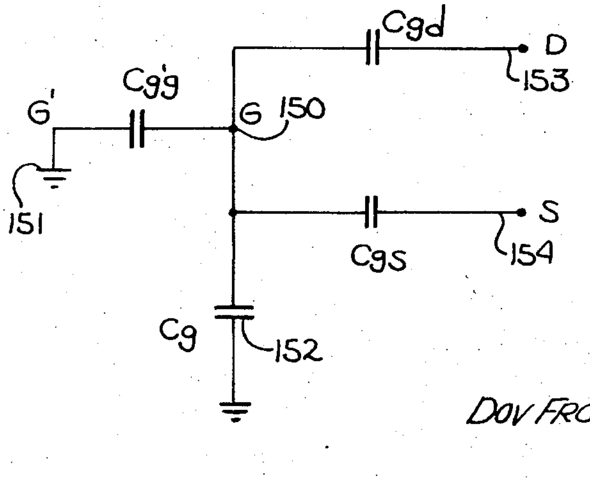
FIG. 9 illustrates the various capacitances associated with the floating gate device (storage element) illustrated in FIG. 1.

In order to erase information from the memory devices such as devices 124, 126, 128 and 143 of FIG. 8, while the metal gates of these devices are grounded certain capacitance conditions for these devices must be met. In FIG. 9 the various capacitances associated with one of the memory storage devices 124 of FIG. 8 is illustrated. Terminal 150 designated as G represents the floating gate 138. Terminal 153 represents the drain of device 124 while terminal 154 represents the source of device 124. Terminal 151 represents the ground connection coupled to the metal gate of device 124 designated as G'. The terminal 152 designates the substrate of the device 124. The various capacitances illustrated in FIG. 9 are the capacitance between the metal gate G' and the floating gate G,$C_{g,g}$; the capacitance between the floating gate G and the drain $C_{gd}$; the capacitance between the floating gate G and the source, $C_{gs}$; and the capacitance between the floating gate and the substrate $C_g$. As is readily seen from FIG. 1 these capacitances are primarily determined by the areas of gate 10 and gate 8 of FIG. 1, the thickness of the insulative layers 7 and 8 of FIG. 1 and the dielectric constant of the material comprising the insulative layers 7 and 9. In order for charge to be removed from the floating gate G when metal gate G' is grounded, it is necessary that $C_{g,g} + C_g$ be much less than $C_{g,d}$ or $C_{gd} + C_{gs}$. When this condition is met charge can be removed from the floating gate G by the application of a negative voltage on the drain or source of the device when the metal gate g' is grounded. This capacitance condition is readily achievable with present MOS technology. The areas of the gates and the thickness of the insulative layers may be readily determined utilizing known techniques.

The storage elements of the array of FIG. 8 such as device 124 have their floating gates such as gate 138 (G) negatively charged when a "0" is stored within the devices and have no charge on their floating gates when a "1" is stored within the devices. In order to program the array the entire array is first programmed with all "1"s. This is also used to erase the array. Following this "0" may be programmed into the desired locations. The following table indicates typical voltages that may be applied to the array of FIG. 8 in order to program the array.

TABLE I

PROGRAMMING

| "0" State | (Erase) "1" State |
|---|---|

| | Selected Line | Unselected Lines | Selected Lines |
|---|---|---|---|
| Y Lines | −35 | 0 | −50 |
| X Lines | −30 | 0 | All X lines are grounded |

In order to erase a Y line of the array, that is, to place the devices in the "1" state, a negative voltage of approximately −55 volts is applied to the selected Y line while all the X lines are grounded. This removes any charge from the floating gates of the devices located along the selected Y line. The unselected Y lines may be left floating or may be grounded. It is, of course, possible to apply negative voltages to all the Y lines and simultaneously erase the entire array.

In order to place a "0" on a selected device as indicated in Table I, a voltage of approximately −35 volts is applied to the selected Y line while a voltage of approximately −30 volts is applied to the selected X line. The unselected lines are grounded.

Note that in Table I during the erase or write "1" mode a negative voltage is applied to the selected Y line while the X lines are grounded. Also during the write "0" mode a negative voltage is applied to the selected Y line while the unselected X lines are grounded. Thus, it might appear that there is a possibility of erasing information on the unselected lines when "0"s are being programmed into a selected device. To prevent this from occurring, a voltage discrimination between the selected Y lines in the programming "O" mode and the selected Y line in the erase mode is utilized. As can be seen from Table I, during the erase mode a voltage of approximately −50 volts is applied to the selected Y line. The selected Y lines during programming of "O"s are held at a voltage of approximately −35 volts as indicated by Table I. This voltage difference of approximately 15 volts is sufficient to avoid erasing information when "O"s are being programmed into a selected device.

Information may be read from the array of FIG. 8 in the same manner as information is read from the array of FIG. 6. For example, if it is necessary to determine the state of device 124, line $Y_1$ is precharged negatively while a negative voltage is applied to the selected X line, line 122. If device 124 has been programmed with a "0" line $Y_1$ will be drawn to ground potential since a conductive path exists between the drain and source of device 124 and between the drain and source of transistor 125. If no charge exists on the floating gate of device 124, that is, the device is programmed with a "1," the charge placed on the $Y_1$ line will remain there, and, hence it may be readily determined whether any selected device in the array has been programmed with a "1" or a "0."

Thus, several embodiments of a memory array which utilizes as a storage element a field effect device having a floating gate and at least one other gate has been disclosed. In some embodiments an array may be fabricated which utilizes one such device per bit of information stored and wherein no insolation means are required for each of the storage elements in the array. Each of the disclosed arrays may be fabricated on a single substrate utilizing known MOS technology.

I claim:

1. A random-access semiconductor memory array which includes a plurality of X lines and a plurality of Y lines comprising:

a common line;

a plurality of storage elements, each comprising a field effect device having a pair of spaced apart $P^+$ regions disposed on an N-type substrate, a floating gate disposed between and insulated from said $P^+$ regions and a second and third gate, each of said devices coupled to at least one of said X lines and one of said Y lines and said common line;

whereby by the application of voltages to said lines information may be programmed into said array and read from said array.

2. The memory array defined in claim 1 wherein said second gate and one of said spaced-apart regions of each of said storage elements is coupled to at least one of said X lines, the other of said spaced-apart regions of each of said storage elements are coupled to one of said Y lines and where said third gate of each of said storage elements is coupled to said common line.

3. The memory array defined in claim 2 wherein said second and third gates are metal gates and said floating gate comprises $P^+$ silicon.

4. The memory array defined by claim 3 wherein said floating gate is completely surrounded by silicon oxide.

5. A random-access memory array which includes a plurality of X lines and a plurality of Y lines comprising:

a first common line;

a second common line; and a plurality of storage elements each coupled to at least one of said X lines and one of said Y lines and to said first and second common lines wherein each of said storage elements comprises a pair of spaced-apart regions of a first conductivity type disposed on a substrate of a second conductivity type, a floating gate disposed between said spaced-apart regions and insulated from said regions, and a second and third gate;

whereby by the application of voltage to said lines information may be programmed into said array and read from said array.

6. The device defined in claim 5 wherein one of said spaced-apart regions of each of said storage elements is coupled to said first common line, said other spaced-apart region of each of said storage elements is coupled to said second common line, said second gate of each of said storage elements is coupled to one of said X lines and said third gate of each of said storage elements is coupled to one of said Y lines.

7. The memory array defined in claim 6 wherein said floating gates of said storage elements comprise a $P^+$ silicon and said second and third gates are metal gates.

8. The device defined in claim 7 wherein said floating gates of said storage elements are completely surrounded with silicon oxide.

9. A random-access semiconductor memory array which includes a plurality of X lines and a plurality of Y lines comprising:

a common ground line;

a second common line;

a plurality of storage elements each coupled to said common ground line, said second common line and at least one of said X and Y lines, each element comprising a field effect device having a pair of spaced-apart $P^+$ regions disposed on an N-type substrate, a floating gate disposed between said spaced-apart regions and insulated from said region, and a second and third gate;

whereby by the application of voltage to said lines information may be programmed into said array and read from said array.

10. The memory array defined in claim 9 wherein one of said spaced-apart regions of each of said storage elements is coupled to one of said Y lines, the other of said spaced-apart regions is coupled to said second common line, said second gate of each of said storage elements is coupled to one of said X lines and the third of said gates of each of said storage elements is coupled to said common ground line.

11. The memory array defined in claim 10 wherein said substrate comprises silicon and said floating gate comprises a $P^+$ silicon.

12. The memory array defined in claim 11 wherein said floating gate is completely surrounded with silicon oxide.

13. A random-access semiconductor memory array including a plurality of X lines and a plurality of Y lines comprising:

at least one common line;

a plurality of memory cells, each comprising: a storage element including a field effect device having a pair of spaced-apart regions of a first conductivity type disposed on a substrate of a second conductivity type, a floating gate disposed between said spaced-apart regions and insulated from said regions; and a field effect transistor coupled to said storage element, said memory cells being coupled to at least one of said X lines and at least one of said Y lines, and said common line and wherein said common line forms a second gate for said storage elements, said second gate being disposed above said floating gate;

whereby by the application of voltage to said lines information may be programmed into said array and read from said array.

14. The memory array defined by claim 13 wherein each of said memory cells has one of said spaced-apart regions of said storage element coupled to one of said Y lines, the other of said spaced-apart regions coupled to one terminal of said field effect transistor, said other terminal of said field effect transistor being coupled to said common line and said gate of said field effect transistor being coupled to one of said X lines.

15. The memory array defined by claim 14 wherein said floating gates of said storage elements comprise $P^+$ silicon.

16. The memory array defined by claim 15 wherein said floating gates of said storage elements are completely surrounded by silicon oxide.

17. The memory array defined by claim 16 wherein the capacitance between said second gate and said floating gate plus the capacitance between said floating gate and said substrate is much less than the capacitance between said floating gate and said spaced-apart regions for each of said storage elements.

18. A random-access semiconductor array containing a plurality of X lines and a plurality of Y lines comprising:

a common line;

a common erase line;

a plurality of memory cells, each of said cells comprising: a storage element which includes a pair of spaced-apart regions of a first conductivity type disposed in a substrate of a second conductivity type, a floating gate disposed between said spaced-apart regions and insulated from said regions, and a second gate disposed above said floating gate, and a field effect transistor coupled in series with said storage element, each of said memory cells being coupled to at least one of said X lines and one of said Y lines and said common line and wherein the second gate of each of said storage elements are coupled to said common erase line;

whereby by the application of voltages to said lines information may be programmed into said array and by the application of the voltage to said common erase line, all the information stored in said array may be erased.

* * * * *